United States Patent [19]

Reeder

[11] Patent Number: 5,198,919
[45] Date of Patent: Mar. 30, 1993

[54] NARROW FIELD OR VIEW SCANNER

[75] Inventor: Robin A. Reeder, Hawthorne, Calif.

[73] Assignee: Hughes Aircraft Company, Los Angeles, Calif.

[21] Appl. No.: 749,832

[22] Filed: Aug. 26, 1991

[51] Int. Cl.⁵ .............................................. G02B 27/17
[52] U.S. Cl. .................................... 359/216; 359/217; 359/203
[58] Field of Search ............................... 359/216–219, 359/203, 201, 202

[56] References Cited

U.S. PATENT DOCUMENTS 4,037,920 7/1977 Runciman et al. .................. 359/218
4,413,878 11/1983 Lettington ........................... 359/216

Primary Examiner—Constantine Hannaher
Assistant Examiner—Don Wong
Attorney, Agent, or Firm—Michael W. Sales; Wanda Denson-Low

[57] ABSTRACT

This invention discloses a narrow field of view scanner (10) incorporating two multi-faceted polygon scanning wheels (12, 16) having a slightly different number of facets (14, 18). Each scanning wheel (12, 16) turns at an angular rate such that a facet (14) on one wheel (12) rotates through a predetermined field of view at the same rate as a facet (18) on the other wheel (16). Further, each of the scanning wheels (12, 16) scan in opposite scanning directions. This does not necessarily mean, however, that the wheels are actually rotating in opposite directions. Because both of the scanning wheels (12, 16) are scanning in opposite directions, the scanning of one scanning wheel (16) substantially cancels the scanning of the other scanning wheel (12). Because of the difference in the number of facets (14, 18) between the two scanning wheels (12, 16), the scanning is not entirely cancel out. By this configuration, a dual multi-faceted scanning wheel can scan a much narrower field of view which could be scanned by a single scanning wheel having the same number of facets. The scanning wheels (42, 44) can be configured relative to each other in a variety of different manners, including rotating about a common axis, to satisfy specific design and space requirements of a scanning system.

3 Claims, 1 Drawing Sheet

NARROW FIELD OR VIEW SCANNER

BACKGROUND OF THE INVENTION

1. Technical Field

This invention relates generally to a scanning device, and more specifically, to a narrow field of view scanning device incorporating two multi-faceted polygon scanning wheels.

2. Discussion

Certain image acquisition systems, such as an integrated forward looking infrared (FLIR) laser radar imaging system, develop an image by collecting an incident radiation beam from a particular scene. To develop the image of the scene, a means to repeatedly scan the scene is included such that the image is developed by a line by line acquisition. It may be desirable to scan a small area, such as a target location, of a larger scene to isolate or detail certain areas of the scene. In view of this, scene images having widely varying sizes are desirable. The size or magnification of the image, defined as the field of view, therefore is varied from one application to another. Consequently, certain design requirements for scanning which acquires a small field of view are different than the requirements for other, larger fields of view.

Most prior art scanning systems incorporate a multi-faceted polygon scanning wheel which rotates at an appropriate rate to scan, and thus, develop an image of a particular scene in a line by line fashion. As the scanning wheel is rotated, a light beam directed onto the multi-faceted wheel is scanned across the scene and a return beam reflected from the scene is directed back through the system. The return beam from the scene impinges on a facet of the multi-faceted wheel through an appropriately configured aperture, and the beam is reflected off of the facet and directed to other appropriate system components to develop the image.

Each time an edge portion between one facet of the multi-faceted scanning wheel and an adjoining facet is rotated across the incident beam from a particular area of the scene, the image is not being fully developed since the full beam needs to be in contact with the facet to develop a clean image. In other words, the image quickly deteriorates when the beam hits the edge of a facet. Since the size of a facet of a multi-faceted wheel determines the size of the field of view, the more facets a wheel has the narrower the field of view of the scanning system. Accordingly, the more facets there are the more times the beam will impinge on the edge portions between adjoining facets. Since this represents downtime of the image acquisition, narrow field of view scanners are incorporated at the expense of time of acquisition.

Servo-driven oscillating mirrors offer an alternative to the multi-faceted scanning wheel. In an oscillating mirror a single faced mirror is oscillated at a predetermined rate such that the desired image is scanned accordingly. The degree of oscillation determines the field of view. However, certain alignment and physical requirements provide that an oscillating mirror cannot scan a particular analogous scene as fast as a multi-faceted scanning wheel can.

What is needed then is a narrow field of view scanning wheel which does not suffer the drawbacks of the downtime of the prior art multi-faceted scanning wheels. Accordingly, it is an object of the present invention to provide such a scanning wheel.

SUMMARY OF THE INVENTION

According to a preferred embodiment of the present invention, a narrow field of view scanner is disclosed incorporating two multi-faceted polygon scanning wheels. The two multi-faceted scanning wheels generally have a slightly different number of facets and are scanned in opposite directions. Even though the scanning wheels are scanned in opposite directions, it does not necessarily mean that they are rotating in opposite directions. The angular turn rates of each of the two multi-faceted scanning wheels are such that a single facet on each wheel will scan a particular scene in the same amount of time. Therefore, since each wheel has a different number of facets they will necessarily be rotating at different speeds.

A radiation beam from a particular source will impinge onto a facet of one of the scanning wheels and be reflected off of it onto a facet of the other scanning wheel. Since the wheels are being scanned in opposite directions, the scanning of the second wheel will subtract from the scanning of the first wheel. Further, since each wheel has a different number of facets and are rotating at different speeds, the subtraction of one scan by the second wheel will not completely cancel the scan of the first wheel. Therefore, the field of view actually imaged will be less than the field of view which would have been imaged by either scanning wheel alone. By this, a very narrow field of view can be quickly scanned without the requirement of having an excessive number of facets of a single scanning wheel of the prior art. Consequently, a reduction of facets translates to a reduction of edge portions between the facets, and thus a reduction of downtime. The scanning wheels can be configured relative to each other to satisfy certain space constraints of the imaging device in which they are incorporated, as long as they satisfy the above-described requirements.

Additional objects, advantages and features of the present invention will become apparent from the following description and appended claims, taken in conjunction with the accompanying drawings.

DETAILED DESCRIPTION OF THE PREFERRED EMBODIMENTS

The following description of the preferred embodiments is merely exemplary in nature and is in no way intended to limit the invention or its application or uses.

According to a preferred embodiment of the present invention there is disclosed a narrow field of view scanner incorporating two multi-faceted polygon scanning wheels. Both multi-faceted scanning wheels scan in opposite directions, although they may not actually be rotating in opposite directions. Further, both scanning wheels incorporate a different number of facets. The angular turn rate of both of the scanning wheels is such that the wheels turn through a single facet in the same amount of time. In other words, the wheel which has the greater number of facets turns at a slower rate than the wheel which has a lesser number of facets. Consequently, the angular rotation rate of the scanning wheels is inversely proportional to the number of facets on the wheel.

The field of view of a scanning wheel is determined by 720°/N, where N is the number of facets on the scanning wheel. For example, a thirty faceted scanning wheel has a scan angle of 24°, (720°/30). The value 720° is used because as the wheel is rotated one (1°) degree the beam which is reflected off of the wheel will be reflected two (2°) degrees. For a dual multi-faceted scanning wheel according to a preferred embodiment of the present invention, the field of view is calculated by the angle of $720°(1/N_1 - 1/N_2)$ where $N_1$ and $N_2$ are the number of facets on the first and second scanning wheels. A narrow field of view scanner consisting of a 30 faceted and a 29 faceted scanning wheel has a field of view of 0.83°, i.e. 720°(1/29−1/30). This is equivalent to a single multi-faceted wheel having 870 facets. Therefore, a dual multi-faceted wheel scanner has the same scan angle as a single multi-faceted wheel having a much greater number of facets, but without suffering the drawbacks of downtime as an incident beam traverses one of the edges between two facets.

Figure 1A:
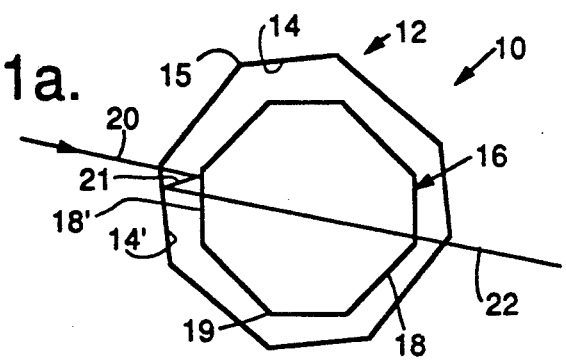
FIG. 1(A)–1(C) is a dual multi-faceted polygon scanning wheel according to a preferred embodiment of the present invention shown from three different perspectives.
Figure 1B:
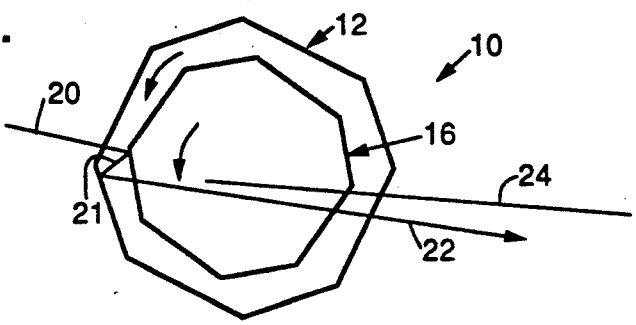
Figure 1C:
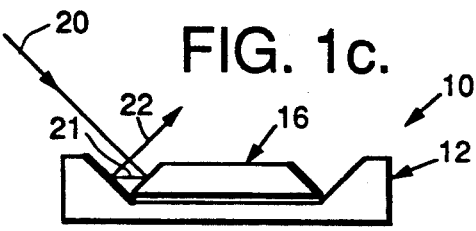

Now turning to FIG. 1(A)–1(C), a dual multi-faceted scanning wheel 10, according to a preferred embodiment of the present invention, is shown. FIG. 1(A) shows dual scanning wheel 10 from a top view. Dual scanning wheel 10 includes an outer multi-faceted scanning wheel 12 having a number of facets 14, here nine (9), and an inner multi-faceted scanning wheel 16 having multiple facets 18, here eight (8). Between adjoining facets 14 are edge portions 15, and between adjoining facets 18 are edge portions 19. A radiation beam 20, typically an infrared beam, is directed from a radiation source (not shown) to impinge on one facet 18' of inner scanning wheel 16. Beam 20 is reflected off of facet 18' as beam 21 towards a facet 14' of outer scanning wheel 12. Reflected beam 21 is reflected off of facet 14' and travels away from dual scanning wheel 10 as beam 22 towards a scene to be imaged. Beam 22 will then be reflected off of a desirable scene back to dual scanning wheel 10. The reflected beam will retrace its path as described above and be directed to appropriate image processing components (not shown).

FIG. 1(B) shows the view of dual scanning wheel 10 from a top view as in FIG. 1(A), but after scanning wheel 12 and scanning wheel 16 have rotated slightly relative to each other. Line 24 represents the position of beam 22 in FIG. 1(A) and thus shows how the system scans a scene. In this example, inner scanning wheel 16 is rotated in a counterclockwise direction, as is outer scanning wheel 12 as shown by the arrows. Since each scanning wheel 12 and 16 rotates at an angular rate such that a facet 18 of inner scanning wheel 16 and a facet 14 of outer scanning wheel 12 turn through the same reference point in the same amount of time, inner scanning wheel 16 is rotating at a slower rate than outer scanning wheel 12. Notwithstanding the fact that scanning wheels 12 and 16 are rotating in the same direction, wheels 12 and 16 are scanning in opposite directions. This can be realized since beam 20 is incident on scanning wheel 16 from one direction and reflected beam 21 is incident on scanning wheel 12 from a substantially opposite direction.

Since scanning wheels 12 and 16 are scanning in opposite directions, the scanning of one wheel cancels the scanning of the other wheel. Further, since the wheels 12 and 16 have a different number of facets and are rotating at different speeds as discussed above, the cancellation effect is not 100% and therefore a small portion of the original scanning is left over as a narrow field of view scan. This field of view is determined by the number of facets of both scanning wheels 12 and 16. By this, the field of view covered by the dual scanning wheel 10 will be smaller than if a single scanning wheel were used having 8 or 9 facets or even 17 (8+9) facets. Moreover, beam 20 does not impinge on an edge portions 15 or 19 as quickly as it would if a single scanning wheel having as many facets for an analogous narrow field of view scanning as would be required to accomplish the same field of view as dual scanning wheel 10.

FIG. 1(C) shows a side view of dual scanning wheel 10. As is apparent, beam 20 impinges from the top portion of dual scanning wheel 10 and outgoing beam 22 is reflected in an outward direction away from beam 20. To accomplish this, all of facets 14 and 18 must be angled upward as shown. In this embodiment, each facet 14 of outer scanning wheel 12 are angled relative to each other at the same angle. The same is true for each facet 18 of scanning wheel 16. In this configuration, a separate vertical scan mirror (not shown) must be incorporated to direct the return beam from the scene (traveling along beam path 22 towards dual scanning wheel 10) to an image plane along successive lines to create a vertical image. In other words, reflected beam 22 from single facet 14' of scanning wheel 12 creates only one horizontal line of the image. Successive facets create the remaining horizontal lines.

It is possible, however, to angle each individual facet 14 and 18 of the inner and outer scanning wheels 12 and 16, respectively to accomplish the same thing as the vertical scanning mirror would. Also, only one of the scanning wheels needs to have facets that are canted to give the vertical scan if only a few scan lines are required. In this configuration, each facet of a particular scanning wheel would be angled slightly different than its adjacent facets to create a separate vertical scan line of the image. For an embodiment of this type the number of horizontal scan lines would be equal to the number of facets of the wheel having the canted facets.

Figure 2:
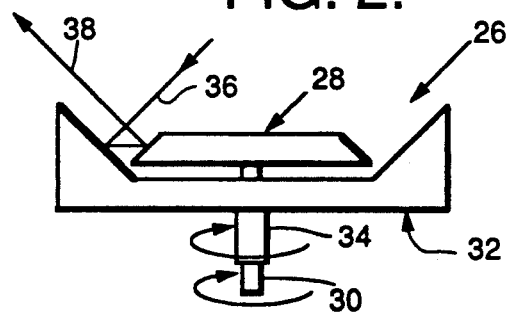
FIG. 2 is a second embodiment of a dual multi-faceted scanning wheel.

FIG. 2 shows a similar configuration to that of FIG. 1(A)–1(C) but in which a beam 36 is directed from a substantially opposite direction than that of beam 20 of FIG. 1(A)–1(C). In FIG. 2, an inner scanning wheel 28 is positioned within an outer scanning wheel 32 such that the individual facets of each scan wheel are tilted upward as with dual scanning wheels 10 of FIG. 1. Here it is shown that each of the scanning wheels 28 and 32 rotates in the same direction on the same axis by means of concentric shafts 30 and 34. Since incident beam 36 impinges from an opposite direction to that of beam 20, scanning wheels 28 and 32 are rotated in a clockwise direction, opposite to the counterclockwise direction of scanning wheels 12 and 16.

Figure 3:
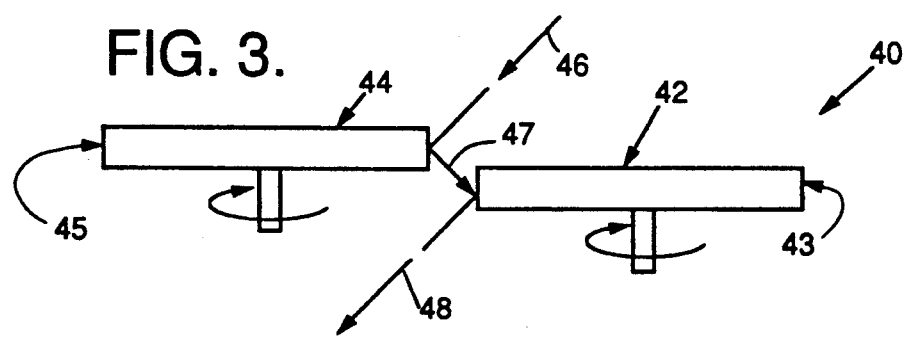
FIG. 3 is a third embodiment of a dual multi-faceted scanning wheel.

The relationship between the individual scanning wheels of the dual wheel configuration can be in a variety of different formats to satisfy certain system requirements, such as space limitations. FIG. 3 shows another embodiment of a dual scanning wheel configuration 40 in which individual scanning wheels 42 and 44 are not concentric. In addition, scanning wheels 42 and 44 are slightly offset from each other as shown. Each scanning wheel 42 and 44 turns in a clockwise direction about substantially parallel axes. Each facet 43 and 45 of scanning wheels 42 and 44 respectively, are substantially parallel to each other, and as such would require a separate vertical scanning mirror to develop the vertical image. An incident beam 46 impinges off of a facet 45 of scanning wheel 44 at a predetermined angle and is reflected as beam 47 onto a facet 43 of scanning wheel 42. Outgoing beam 48 is reflected downward from scanning wheel 42. As with the above-described embodiments, the number of facets determines the field of view.

Figure 4:
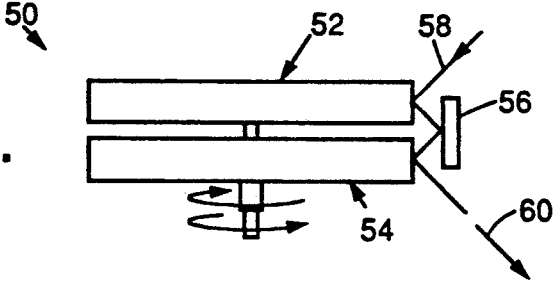
FIG. 4 is a fourth embodiment of a dual multi-faceted scanning wheel.

FIG. 4 shows yet another embodiment of a dual scanning wheel configuration shown generally at 50. In this embodiment concentric shafted scanning wheels 52 and 54 are positioned proximate a reflecting mirror 56 as shown. Here, scanning wheels 52 and 54 are of substantially the same size as compared with scanning wheels 12 and 16, and are configured one on top of the other as shown. An incident beam 58 from an upper portion of dual scanning wheel 50 is reflected off a facet of first wheel 52 and onto reflecting mirror 56. The reflected beam is reflected off of mirror 56 and onto a facet of second scanning wheel 54 such that outgoing beam 60 is traveling in a downward direction as shown. In this embodiment, scanning wheels 52 and 54 are turning in opposite directions to accommodate the opposite scanning requirements.

As is apparent, an unlimited number of configurations of the dual scanning wheels can be realized and still satisfy the above-described requirements. The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A narrow field of view scanner comprising:
   a first scanning wheel having a first number of facets;
   a second scanning wheel having a second number of facets, said second number of facets different than said first number of facets;
   first rotating means for rotating said first scanning wheel; and
   second rotating means for rotating said second scanning wheel, wherein said first and second rotating means rotates said first and second scanning wheels at a rate such that a facet of said first scanning wheel moves through a predetermined point in the same time as a facet of said second scanning wheel moves through said point and wherein said first rotating means rotates said first scanning wheel in a direction opposite to the direction said second rotating means rotates said second scanning wheel.

2. A narrow field of view scanner comprising:
   a first scanning wheel having a first number of facets;
   a second scanning wheel having a second number of facets, said second number of facets different than said first number of facets;
   first rotating means for rotating said first scanning wheel; and
   second rotating means for rotating said second scanning wheel, wherein said first and second rotating means rotates said first and second scanning wheels at a rate such that a facet of said first scanning wheel moves through a predetermined point in the same time as a facet of said second scanning wheel moves through said point and wherein the first scanning wheel and the second scanning wheel are positioned on a common axis adjacent a reflecting mirror and said first rotating means and said second rotating means rotate said first and second scanning wheels in opposite directions about the common axis, and further wherein said first number of facets and said second number of facets are parallel to each other.

3. A method of scanning a field of view comprising the steps of:
   rotating a first scanning wheel having a plurality of facets about an axis; rotating a second scanning wheel having a plurality of facets about an axis, wherein said second scanning wheel has a different number of facets than said first scanning wheel; and
   rotating said first scanning wheel and said second scanning wheel relative to each other such that each scanning wheel turns at a rate wherein one facet of said first scanning wheel and one facet of said second scanning wheel rotates through a reference point in substantially the same amount of time wherein the steps of rotating includes rotating said first scanning wheel and said second scanning wheel in opposite directions.

* * * * *